(12) United States Patent
Brooks

(10) Patent No.: US 6,244,126 B1
(45) Date of Patent: Jun. 12, 2001

(54) GEAR RATIO MULTIPLIER

(76) Inventor: Eddie L. Brooks, 2742 Andrade, Richmond, CA (US) 94804

( * ) Notice: Subject to any disclaimer, the term of this patent is extended or adjusted under 35 U.S.C. 154(b) by 0 days.

(21) Appl. No.: 09/063,010

(22) Filed: Apr. 21, 1998

Related U.S. Application Data

(63) Continuation-in-part of application No. 08/912,397, filed on Aug. 18, 1997, now Pat. No. 5,913,938.

(51) Int. Cl.$^7$ ........................................... F16H 1/12
(52) U.S. Cl. ................................................ 74/423
(58) Field of Search .................. 180/374, 375, 180/376, 365; 74/745, 423, 424; 475/221, 225

(56) References Cited

U.S. PATENT DOCUMENTS

| | | | |
|---|---|---|---|
| 829,958 | * 9/1906 | Fairman | 74/423 X |
| 1,017,954 | 2/1912 | Cake . | |
| 1,085,501 | * 1/1914 | Smith | 180/365 X |
| 1,596,480 | * 8/1926 | Cosgrove et al. | 180/365 |
| 1,604,297 | * 10/1926 | Morgan | 180/365 X |
| 1,631,996 | 6/1927 | Wirrer . | |
| 3,580,350 | 5/1971 | Arkus-Duntov . | |
| 3,901,096 | * 8/1975 | Woody | 180/365 X |
| 4,142,422 | 3/1979 | Haefner . | |
| 4,353,429 | * 10/1982 | Herron | 74/606 R X |
| 4,387,605 | * 6/1983 | Grey et al. | 180/374 |
| 4,485,692 | * 12/1984 | Moore et al. | 74/745 |
| 4,499,790 | 2/1985 | Helms . | |

(List continued on next page.)

OTHER PUBLICATIONS

Norton, Robert L. Design of Machinery, N.Y., McGraw–Hill, 1992, p. 204, 205, 397, 405, 408, &409, 1992.*

Stokes, Alec. Gear Handbook: design and calculations. Butterworth–Heinemann Ltd, 1992. p. 70–83, 1992.*

Brejcha, Mathias. Automatic Transmissions and Transaxles. Prentice Hall, 1993. p. 50–53 and 75–103, 1993.*

*Primary Examiner*—Charles A Marmor
*Assistant Examiner*—Ankur Parekh
(74) *Attorney, Agent, or Firm*—Millen, White, Zelano & Branigan, P.C.

(57) ABSTRACT

In a first embodiment of the invention, a gear ratio multiplier has directly cooperating gears which serve to rotatably connect an input shaft to an output shaft through an intermediate shaft. The input and output shafts have parallel axes of rotation and extend, respectively, from seals in opposite sides of a housing. The inner ends of the input and output shafts are spaced from one another and are each provided with a pinion gear. The intermediate shaft is rotatably carried between the pinion gears and has an axis of rotation positioned at right angles to the axes of rotation of the input and output shafts. A pair of differently sized ring gears having different numbers of teeth are affixed on the intermediate shaft. The pinion gear on the input shaft engages the relatively smaller ring gear on the intermediate shaft whereas the pinion gear on the output shaft engages the relatively larger ring gear on the intermediate shaft. In this first illustrated embodiment, the gear ratio multiplier is utilized in the power train of a motor vehicle and is positioned between the transmission and propeller shaft to modify the gear ratio between the engine and one or more drive axles. Other embodiments of the invention utilize other gear assembly arrangements such as, but not limited to, sun and planetary gear arrangements and ring gear arrangements. While a motor vehicle is shown, this use of a gear ratio multiplier is applicable to other devices or machines such as, but not limited to, water vehicles, helicopters, construction machinery or any other engine driven device.

4 Claims, 11 Drawing Sheets

U.S. PATENT DOCUMENTS

| | | |
|---|---|---|
| 4,502,347 | 3/1985 | Norris et al. . |
| 4,539,856 * | 9/1985 | Frost .................................... 74/363 |
| 4,685,340 | 8/1987 | Shust et al. . |
| 4,856,611 * | 8/1989 | Teraoka et al. .................... 180/233 |
| 4,951,527 * | 8/1990 | Klazura ................................ 74/745 |
| 5,078,416 * | 1/1992 | Keyes .............................. 74/423 X |
| 5,107,951 | 4/1992 | Kawamura . |
| 5,249,481 * | 10/1993 | Lasoen ................................ 74/745 |
| 5,358,457 | 10/1994 | Braun . |
| 5,913,938 * | 6/1999 | Brooks ................................ 74/417 |

* cited by examiner

DATE:                                                TIME: 04:53 pm
OWNER:                                            LICENSE: NY4 626
   VIN: 2GDEC19KXS1538635              ODOMETER: 48940

YEAR: 1995                           INERTIA WEIGHT (lbs): 4750
MAKE: GMC                             LOAD @ 50 mph (hp): 18.5
MODEL: 1500 PICKUP 2WD                  ENGINE SIZE (l): 5.7
 TYPE: LDGT 1                              CYLINDERS: 8

TEST EVALUATION

ACTUAL: 1.978 MILES              DRIVE CURVE VIOLATIONS: 0
TARGET: 1.959 MILES              DRIVE CURVE EVALUATION: PASS

VOLUME: ---- LITERS PURGED            PURGE RESULTS: NONE

TEST RESULTS

|  | HC | CO | NOX | CO2 | EST. MPG |
|---|---|---|---|---|---|
| TOTAL GRAMS/mi: | 1.21 | 4.61 | 2.28 | 672.12 | 12.76 |
| COMPOSITE STANDARD: | 1.60 | 40.00 | 2.50 | | |
| COMPOSITE RESULTS: | PASS | PASS | MARGINAL | | |
| PHASE 1 GRAMS/mi: | 2.37 | 9.78 | 3.65 | 686.06 | 12.19 |
| PHASE 2 GRAMS/mi: | 0.74 | 2.55 | 1.73 | 666.53 | 13.00 |
| PHASE 2 STANDARD: | 1.00 | 32.00 | | | |
| PHASE 2 RESULTS: | PASS | PASS | | | |
| FINAL RESULTS: | PASS | PASS | MARGINAL | | |

EPA IM240 FINAL STANDARDS

FIG. 9

| | | | | | |
|---|---|---|---|---|---|
| DATE: | | | TIME: | | 02:29 pm |
| OWNER: | | | LICENSE: | | NY4 626 |
| VIN: | 2GDEC19KXS1538635 | | ODOMETER: | | 48940 |
| YEAR: | 1995 | | INERTIA WEIGHT (lbs): | | 4750 |
| MAKE: | GMC | | LOAD @ 50 mph (hp): | | 18.5 |
| MODEL: | 1500 PICKUP 2WD | | ENGINE SIZE (l): | | 5.7 |
| TYPE: | LDGT 1 | | CYLINDERS: | | 8 |

TEST EVALUATION

| | | | | |
|---|---|---|---|---|
| ACTUAL: | 1.964 MILES | | DRIVE CURVE VIOLATIONS: | 0 |
| TARGET: | 1.959 MILES | | DRIVE CURVE EVALUATION: | PASS |
| VOLUME: | ---- LITERS PURGED | | PURGE RESULTS: | NONE |

TEST RESULTS

| | HC | CO | NOX | CO2 | EST. MPG |
|---|---|---|---|---|---|
| TOTAL GRAMS/mi:<br>COMPOSITE STANDARD:<br>COMPOSITE RESULTS: | 0.79<br>1.60<br>PASS | 2.74<br>40.00<br>PASS | 1.79<br>2.50<br>PASS | 752.70 | 11.53 |
| PHASE 1 GRAMS/mi: | 1.01 | 2.30 | 1.51 | 765.39 | 11.36 |
| PHASE 2 GRAMS/mi:<br>PHASE 2 STANDARD:<br>PHASE 2 RESULTS: | 0.70<br>1.00<br>PASS | 2.91<br>32.00<br>PASS | 1.90 | 747.68 | 11.59 |
| FINAL RESULTS: | PASS | PASS | PASS | | |

EPA IM240 FINAL STANDARDS

FIG. 10

GEAR RATIO MULTIPLIER

CROSS REFERENCE TO RELATED APPLICATION

This application is a continuation-in-part of application Ser. No. 08/912,397, filed Aug. 18, 1997, now U.S. Pat. No. 5,913,938.

FIELD OF THE INVENTION

The present invention relates generally to machine elements or mechanisms and, in particular, to a gearing system having directly cooperating gears with intersecting axes of rotation.

BACKGROUND OF THE INVENTION

A transmission provides different gear ratios between the engine and drive wheels of a typical land vehicle. The transmission enables the vehicle to accelerate from rest up to a maximum speed through a wide speed range while the engine operates efficiently. In most applications, the transmission is positioned in the vehicle power train between the engine and the propeller shaft. The engine's power flows through the transmission and propeller shaft and is delivered to the differential and drive axles.

Most vehicle transmissions operate within a preset range of gear ratios. This is a problem for special purpose vehicles, such as pickup trucks, used for carrying or towing heavy loads. Excessive engine and transmission wear, fuel consumption, and operating costs can result from gear ratios that are set too low at the time of their manufacture, "gear ratio" being defined as output speed divided by input speed. A need, therefore, exists for an "add-on" assembly which can be easily and economically inserted into the power train of a vehicle for increasing the gear ratio between the engine and drive axles. Moreover, there is need in passenger cars, boats, ships, helicopters, small trucks, heavy trucks, front wheel drives and motorcycles for improved efficiency and reduction in air pollution which results from improved efficiency.

SUMMARY OF THE INVENTION

In view of the limitations associated with known vehicle transmissions, it is a principal object of the invention to provide a gear ratio multiplier which can be operatively connected between a factory installed transmission and propeller shaft to increase ratio and torque, increase the gear ratio and torque between the engine and drive axles of the associated vehicle.

It is another object of the invention to provide a gear ratio multiplier featuring spiral bevel gears. The tooth inclination of such gears brings more teeth in contact at any one time than with equivalent straight bevel gears. The result is smoother and quieter operation, particularly at high speeds, and greater load-carrying ability than with straight bevel gears.

It is a further object of the invention to provide gear ratio multiplier of the type described which, during use, will increase torque imparted to the drive axles, decrease fuel consumption, increase engine and transmission life, and reduce vehicle operating costs.

It is an object of the invention to provide improved elements and arrangements thereof in a gear ratio multiplier for the purposes described which is lightweight in manufacture, inexpensive in construction and installation, and fully effective in use.

In its broadest aspect, the present invention is directed to the concept of positioning a gear ratio multiplier between a transmission and drive shaft or propeller shaft of a device powered by an internal combustion engine, such as land, water or air vehicles, or any type of device or machine.

More specifically, the gear ratio multiplier comprises a gear assembly disposed between an engine and a driven device, wherein the gear assembly first increases torque by decreasing shaft speed (RMP) within the assembly and then increases shaft speed (RPM) before transferring that increased shaft speed to the driven device.

Briefly, the gear ratio multiplier in accordance with a first embodiment of this invention achieves the intended objects by featuring directly cooperating gears which serve to rotatably connect an input shaft to an output shaft through an intermediate shaft. The inner ends of the input and output shafts are spaced from one another and are each provided with a substantially identical pinion gear. The intermediate shaft is rotatably carried between the pinion gears and has a pair of differently sized ring gears. The larger ring gear includes more teeth than the smaller ring gear. The pinion gear on the input shaft engages the smaller ring gear whereas the pinion gear on the output shaft engages the larger ring gear. When rotated, the input shaft drives the output shaft with an accompanying mechanical advantage.

While the aforementioned first embodiment was employed in a successful application of the invention, it is also within the scope of this invention to employ other types of gear assembly arrangements such as, but not limited to, planetary gear and ring gear arrangements.

The foregoing and other objects, features and advantages of the present invention will become readily apparent upon further review of the following detailed description of the various preferred embodiments as illustrated in the accompanying drawings.

BRIEF DESCRIPTION OF THE DRAWINGS

The present invention may be more readily described with reference to the accompanying drawings, in which:

FIG. 9 is a chart showing emissions for vehicle not equipped with a gear ratio multiplier; and FIG. 10 is a chart showing emissions for a vehicle equipped with a gear ratio multiplier according to the present invention.

Similar reference characters denote corresponding features consistently throughout the accompanying drawings.

DETAILED DESCRIPTION OF THE PREFERRED EMBODIMENT

Figure 1:
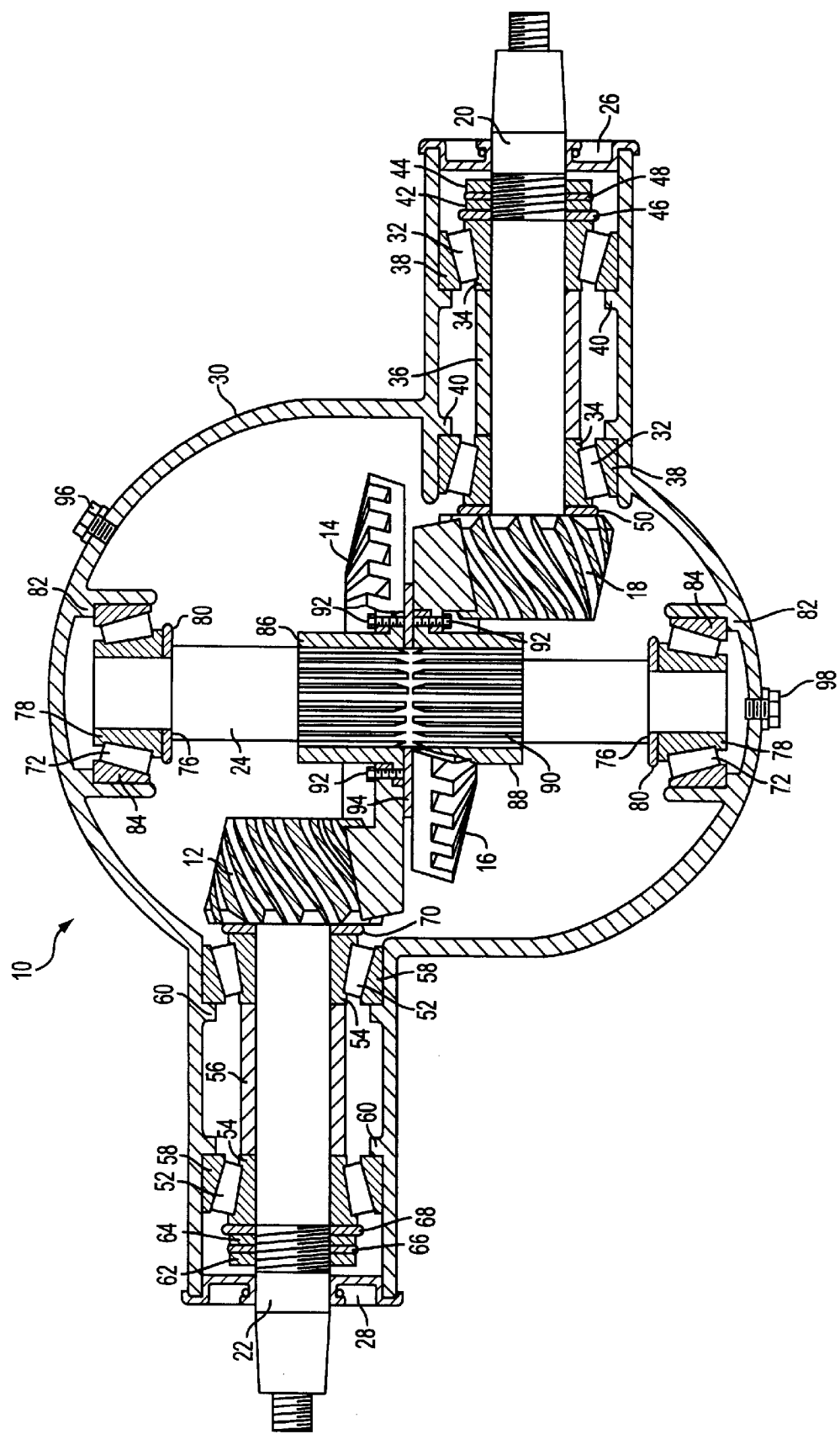
FIG. 1 is a cross-sectional view of a first embodiment of a gear ratio multiplier in accordance with the present invention.
Figure 2:
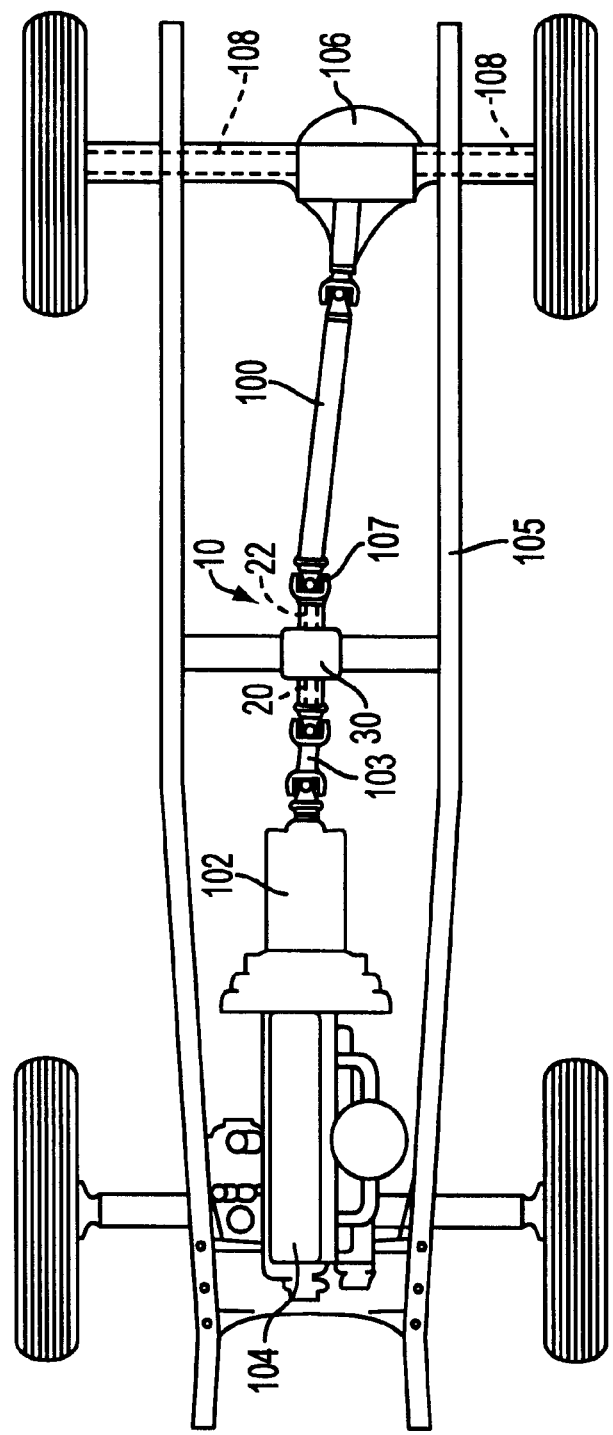
FIG. 2 is a diagrammatic view of a vehicle power train including the transmission of FIG. 1.

Referring now to the FIGS. 1 and 2, a gear ratio multiplier assembly in accordance with the present invention is shown at 10. The assembly 10 includes four, directly cooperating gears 12, 14, 16, and 18 which serve to rotatably connect an input shaft 20 to an output shaft 22 through an intermediate shaft 24. The input shaft 20 and output shaft 22 have parallel axes of rotation and extend, respectively, from seals 26 and 28 in opposite sides of a housing 30. The inner ends of the input and output shafts 20 and 22 are spaced from one another and are provided with substantially identical pinion gears 12 and 18. As is seen in FIG. 1, at least the pinion gears 12 and 18 are spiral bevel gears which necessarily have tooth inclination, i.e., the teeth are disposed at an angle relative to the axes of the pinion gears. The gears may also be hypoid gears. The intermediate shaft 24 is rotatably carried between the pinion gears 12 and 18 and has an axis of rotation positioned at right angles to the axes of rotation of both the input shaft 20 and output shaft 22. A pair of ring gears 14 and 16, having different numbers of teeth, are affixed in a back-to-back relationship on the intermediate shaft 24. The pinion gear 18 on the input shaft 20 engages the relatively smaller, ring gear 16 to form a first gear assembly on the intermediate shaft 24 whereas the pinion gear 12 on the output shaft 22 engages the relatively larger, ring gear 14 to form a second gear assembly on the intermediate shaft. As is seen in FIG. 1, the pinions 12 and 18 have the same diameter (since they are substantially identical). The first ring gear 16 has a larger diameter than the first pinion 18 with which it meshes, accordingly, the second ring gear 14 rotates through a smaller angular rotation than the second pinion 18 and thus at a slower speed. The second ring gear 14 has a larger diameter than the first ring gear 16, but it rotates at the same speed as the first ring gear 16 because it is fixed to the same shaft, shaft 24. Since the second ring gear 14 has a larger diameter, it has more teeth than the first ring gear 16; however second ring gear 14 meshes with second pinion 12 which has the same number of teeth as the first pinion 18. Therefore, one rotation of second ring gear 14 necessarily results in more than one rotation of the second pinion 12 so that there is an increase in speed between the second ring gear 14 and second pinion 12. In the arrangement of FIG. 2, the result of FIG. 7 occurs where there is an increase in speed with minimal reduction in torque.

In the arrangement of FIG. 1, the ratio of the pitch diameter $dp_1$ of the first pinion 18 (input pinion) to the pitch diameter $dp_2$ of the first ring gear 16 (input ring gear) is larger than the ratio of the pitch diameter $dp_1$ of the second pinion 12 (outlet pinion) to the second pitch diameter $dp_2$ of the second ring gear 14 (output ring gear). The ratio of the number of teeth $nt_1$ of the first pinion 18 (input pinion) to the number of teeth $nt_2$ of the first ring gear 14 (input ring gear) is greater than the ratio of the number of teeth $nt_1$ of the second pinion 12 (output pinion) to the number of teeth $nt_2$ of the second ring gear 14 (output ring gear).

The input shaft 20 is rotatably supported within the housing 30 by a pair of roller bearings 32 spaced along its length. The inner races 34 of the bearings 32 are maintained at a fixed distance from each other by a tubular spacer 36 encircling the input shaft 20. The outer races 38 of the bearings 32, however, are held apart by stops 40 projecting inwardly from the side walls of the housing 30. A pair of lock nuts 42 and 44 threaded onto the outer end of the input shaft 20, along with adjacent washers 46 and 48, serve to drive the bearings 32 together and fix the position of the pinion gear 18 within the housing 30. Fine longitudinal adjustment of the position of the pinion gear 18 is achieved by varying the thickness of the washer 50.

Like the input shaft 20, the output shaft 22 is rotatably supported by spaced roller bearings 52. The inner races 54 of the bearings 52 are maintained in position by a tubular spacer 56 whereas the outer races 58 are supported by stops 60. Similarly, lock nuts 62 and 64 and washers 66 and 68, secured to the output shaft 22, fix the position of the pinion gear 12. A washer 70 of predetermined thickness is positioned on the output shaft 22 and against the pinion gear 12 to finely adjust the position of the gear 12.

The intermediate shaft 24 is rotatably journaled at its opposite ends in roller bearings 72. Shoulders 76 on the intermediate shaft set the respective positions of the inner races 78 of the bearings 72. Spacing washers 80, of predetermined thickness and located between the shoulders 76 and inner races 78, permit the vertical positioning of the intermediate shaft 24 to be adjusted as desired by a user. Stops 82 projecting inwardly from the side walls of the housing 30 retain the outer races 84 of the bearings 72.

Although the pinion gears 12 and 18 are preferably machined onto the ends of the shafts 20 and 22 so as to form an integral part thereof, the ring gears 14 and 16 are preferably releasably secured to the intermediate shaft 24. As shown, a pair of ring gear cranks 86 and 88 are connected by means of grooves 90 to the intermediate shaft 24 for rotation therewith. Bolts 92 secure the ring gears 14 and 16 to the cranks 86 and 88. A disk-shaped spacer 94 separates the cranks 86 and 88 as well as the ring gears 14 and 16.

Openings are provided in the housing 30 for adding and withdrawing lubrication oil. An opening, normally closed by bolt 96, in the top of the housing 30 is provided for filling the housing 30 with oil prior to normal use of the assembly 10. An opening, closed by bolt 98, in the bottom of the housing 30 permits used oil to be drained from the housing 30.

Installation of the assembly 10 in a vehicle unequipped with such is straight forward and illustrated diagrammatically in FIG. 2. The propeller shaft 100 of the vehicle is first removed and shortened somewhat using conventional machine tools and processes. Next, the input shaft 20 is aligned with the transmission 102 and is joined to it with connector 103. The housing 30 is then secured by any suitable means to the undercarriage 105 of the vehicle. Finally, the shortened propeller shaft 100 is joined to the output shaft 22 of the assembly 10 using connector 107. When the vehicle engine 104 is now energized to drive the transmission 102, power will flow through the assembly 10, propeller shaft 100, differential 106 and drive axles 108 to drive wheels 110.

While the invention has been described with a high degree of particularity, it will be appreciated by those skilled in the art that numerous modifications and substitutions may be made thereto. For example, the gear ratio provided by the gears 12, 14, 16 and 18 is largely a matter of choice and may be varied as desired.

Figure 3:
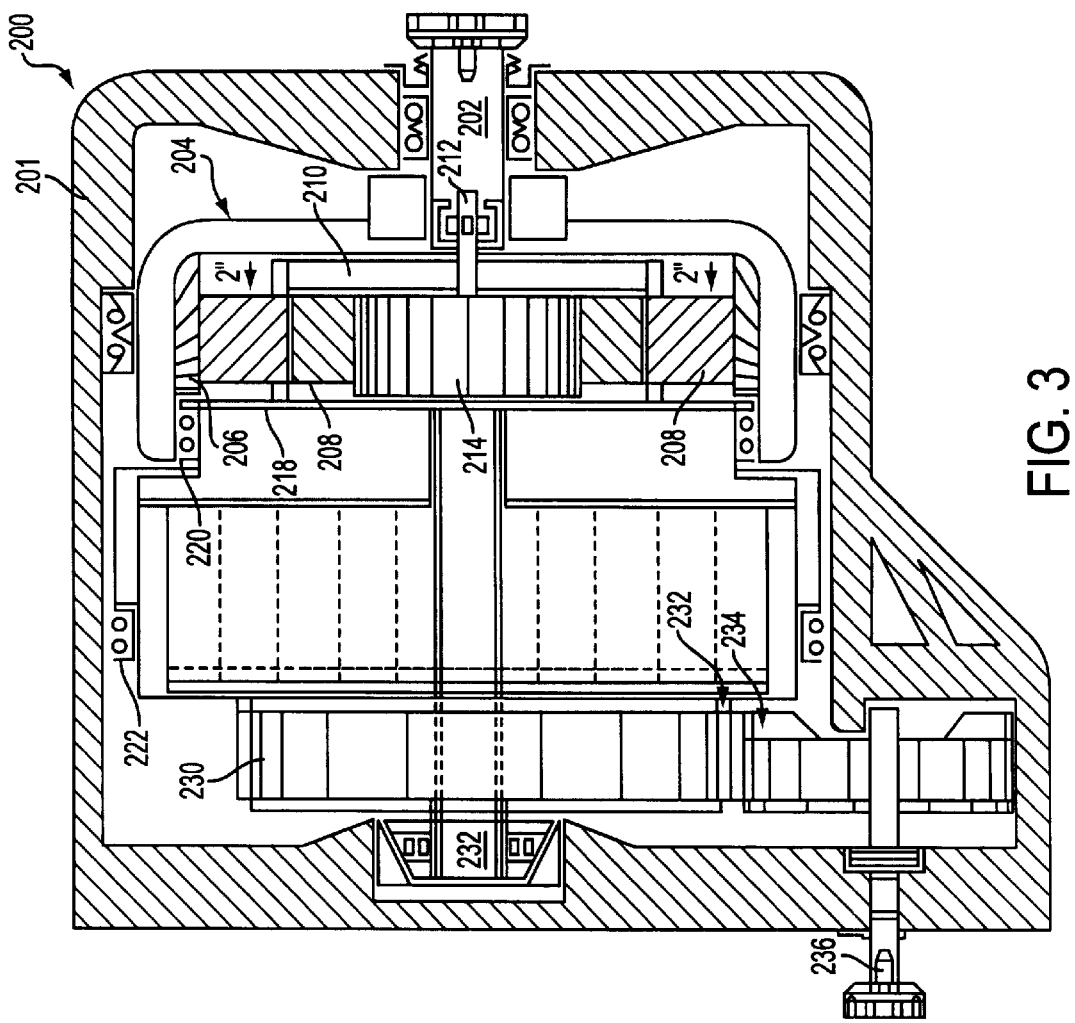
FIG. 3 is a cross-sectional view of a second embodiment of a gear ratio multiplier in accordance with the present invention.

Referring now to FIG. 3, there is shown a second embodiment of a reduction gear assembly 30, identified generally by a numeral 200. the reduction gear assembly 200 is a planetary gear assembly within a housing 201 comprising an input shaft 202 which is coupled to the engine of FIG. 2 by a coupling 103 through the transmission 102 (see FIG. 2). The input shaft 202 is connected to a drum gear 204 having internal teeth 206. The internal teeth 206 of the drum gear 204 mesh with planetary gears 208 which are mounted on a frame 210 which is journaled by a shaft 212 to rotate freely with respect to the drum gear 204 fixed to the input shaft 202. The planetary gears 208 mesh with a sun gear 214, while the mounting shafts 216 of a frame 210 drive a hub 218 which is supported by a first set of bearings 220 in the frame 204 and is supported with respect to the housing 201 by bearings 222. The hub 218 has a spur gear 230 fixed thereto which is supported on a shaft 232. The spur gear 230 has teeth 232 which mesh with the teeth of a pinion gear 234. Pinion gear 234 drives an output shaft 236. The output shaft 236 is coupled by a connector 107 to the propeller shaft 100 of the vehicle shown in FIG. 2.

Figure 4:
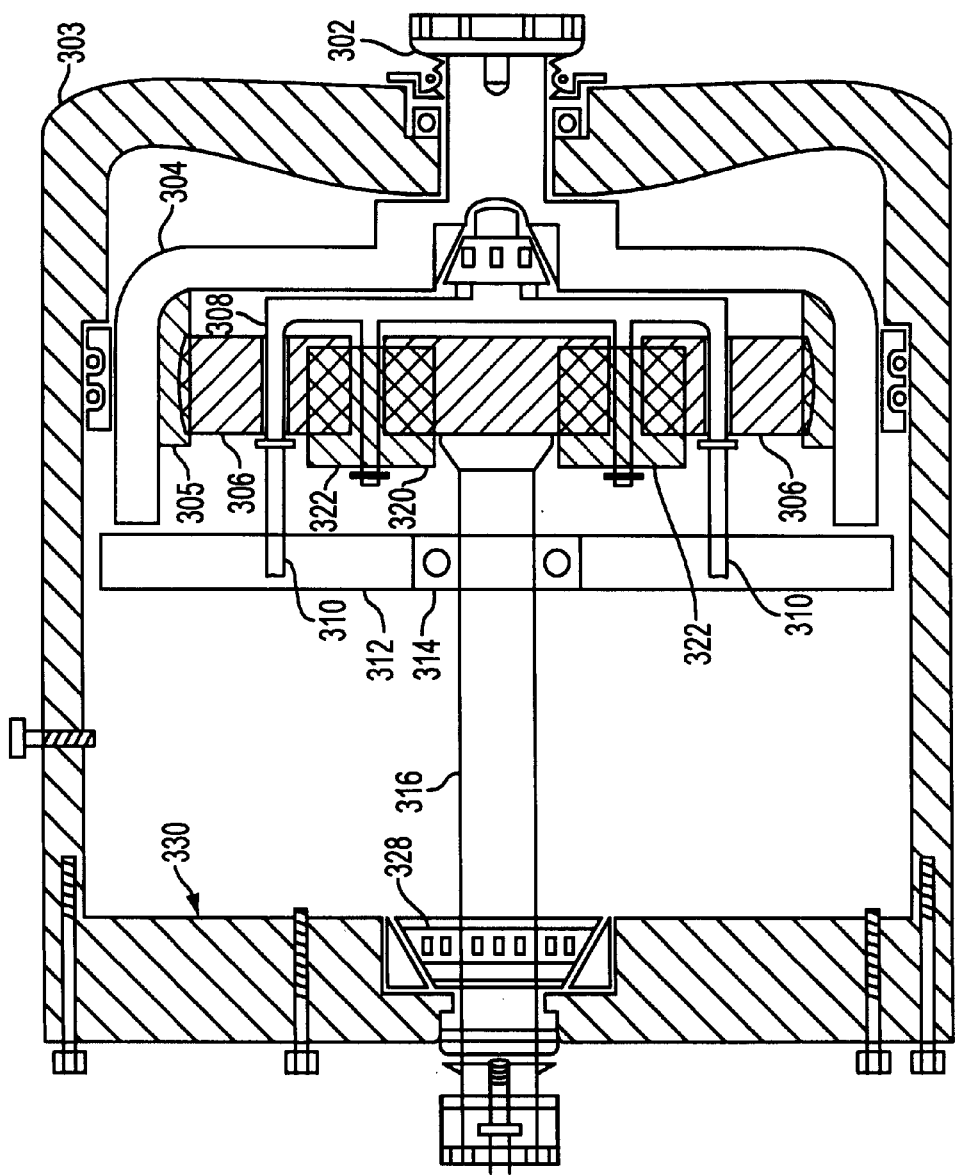
FIG. 4 is a cross-sectional view of a third embodiment of a gear ratio multiplier in accordance with resent invention.

Referring now to FIG. 4, where a third embodiment 300 of the speed reducing gear is illustrated, an input shaft 302 is journaled in a housing 303 and is unitary with a drum gear 304. The drum gear 304 has internal teeth 305 which mesh with three planetary gears 306. The three planetary gears 306 are mounted on a frame 308 so configured to allow the planetary gears to rotate on shafts 310 which are part of the frame. The shafts 310 are mounted in the stabilizing plate 312 which is journaled by bearings 314 on an output shaft 316. At one end of the output shaft 316 there is fixed the sun gear 320. The sun gear 320 is driven by a second set three of planetary gears 322 which in turn are driven by a first set of planetary gears 306 to rotate the sun gear 320 with which the second set of planetary gears 322 are meshed. This drives the output shaft 316 to rotate within a bearing 328 mounted in an end plate 330 of the housing 303. The output shaft 316 is coupled by a coupling of 107 to a propeller shaft 100 when the arrangement is used to drive a vehicle (see FIG. 2).

Figure 5A:
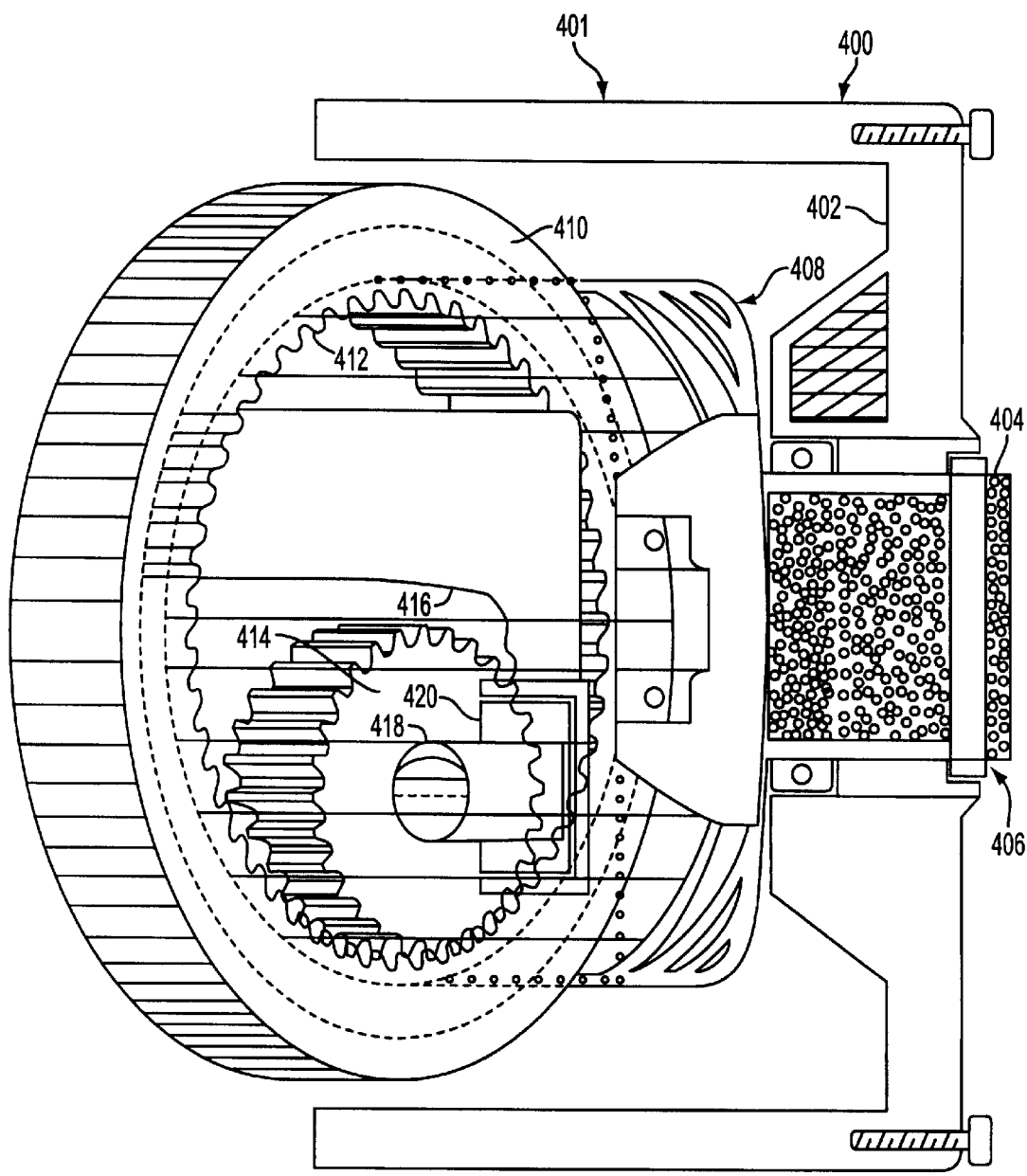
FIGS. 5A and 5B are cross-sectional, perspective views of a fourth embodiment of a gear ratio multiplier in accordance with the present invention.
Figure 5B:
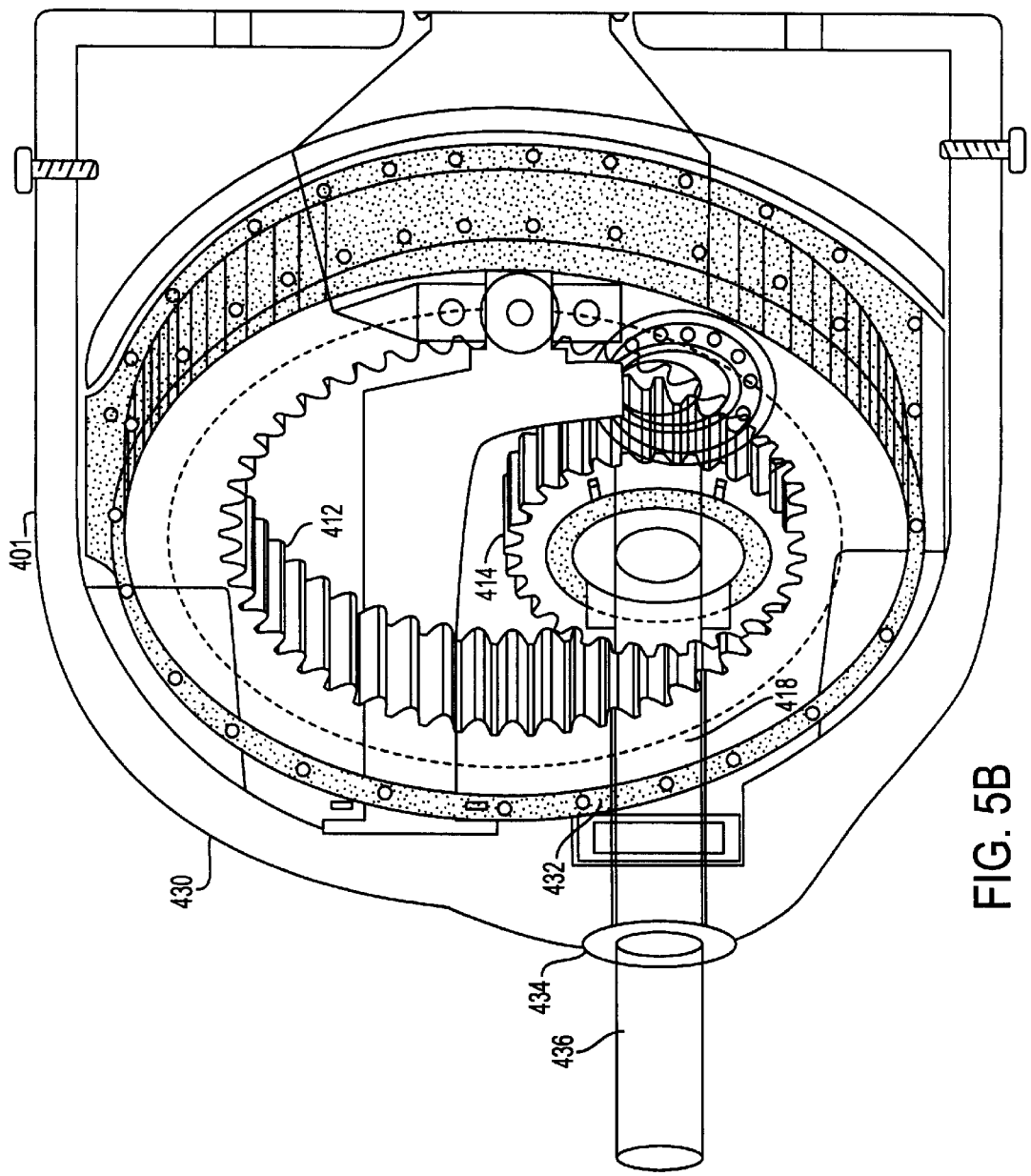

Referring now to FIGS. 5A and 5B which when combined illustrate a fourth embodiment of the invention, a reduction gear 400 is mounted in a housing 401 which is enclosed by a first end plate 402. The end plate 402 has journaled therein an input shaft 404 which is sealed by front oil seal 406. The input shaft 404 is fixed to a drum 408 which is in turn unitary or integral with ring gear 410. Consequently, as the input shaft 404 rotates the ring gear 410 rotates with internal gear teeth 412 thereof meshing with pinion 414. The pinion 414 is journaled to an L-shaped support strut 416 by a shaft 418 which is received in a bearing 420 also mounted in an L-shaped support strut 416. The L-shaped support strut 416 is bolted to the front end 424 of the housing 401. Preferably, the housing 401 includes a ventilator 440, a lubrication fill plug 442 and a lubrication drain plug 444.

The pinion 414 is fixed to the shaft 418 which is journaled by a bearing 432 in the front end 430 of the housing 401. An oil seal 434 keeps the gear oil within the housing 401 contained therein. A projecting portion 436 of the shaft 418 forms the output shaft of the gear 400. The output shaft 436 is then coupled by coupling a 107 to a propeller shaft 100 of the vehicle shown in FIG. 2.

Figure 6:
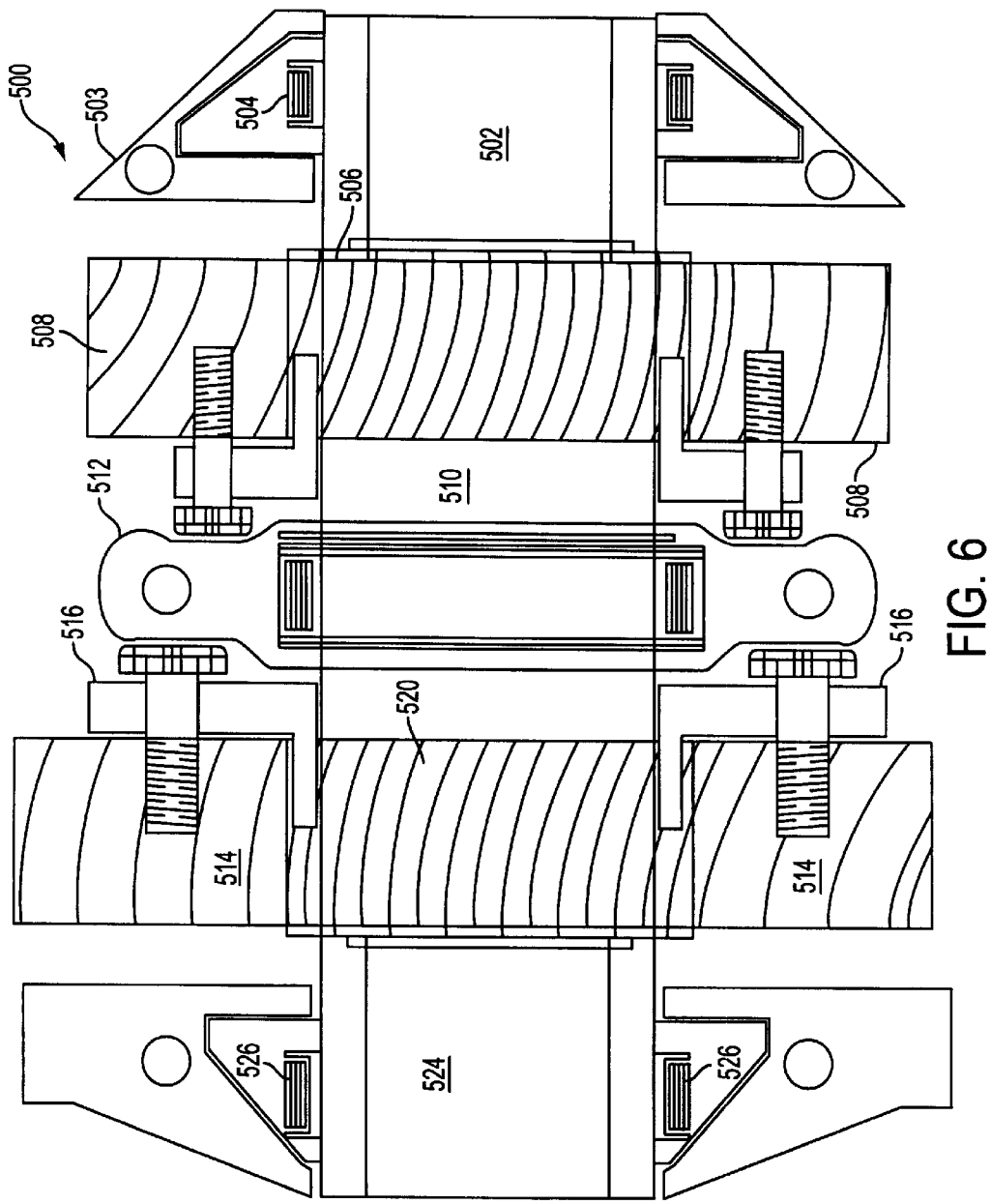
FIG. 6 a cross-sectional view of a fifth embodiment of gear ratio multiplier in accordance with the present invention.

Referring now to FIG. 6, a fourth embodiment 500 of the reduction gear 500 is disclosed in which an input shaft 502 which is journaled in a housing 503 by the roller bearing 504 is fixed to a sun gear 506. The sun gear 506 meshes with a plurality of planet gears 508 which may be, for example, 2, 3, or 4 in number, which planet gears are mounted on a shaft 510 supported by an intermediate bearing 512. The sun gear 506 drives the planetary gears 508 to rotate the shaft 510, and the shaft 510 is coupled to a second set of second planet gears 514. The second set of planetary gears 514 have diameters larger than the first set of planetary gears 508. This second set of planetary gears 514 are fixed on the shaft 510 by L-shaped brackets or a flange 516. The second set of planetary gears 514 drive a second sun gear 520 which is fixed to an output shaft 524 journaled in bearings 526. Referring again to FIG. 2, when the gear assembly 500 is mounted in a vehicle, then the input shaft 502 is coupled by the coupling of 103 to the transmission 102 and the output shaft 524 is coupled by the coupling of 107 to the propeller shaft 100.

It is emphasized that while this arrangement has been tested on and is suitable for road vehicles such as the rear wheel drive vehicle of FIG. 2, it is also usable with front-wheel drive vehicles wherein one of the gear ratio multiplier assemblies shown is disposed between the transmission of the front-wheel drive vehicle and each of the shafts that drive the front wheels, i.e., two gear boxes are used. In addition, the gear assemblies shown in the embodiments of this invention are incorporated directly in an automatic transmission between the output of the automatic transmission and propeller shaft or other drive shafts coupled with the driving wheels of a vehicle.

While the gear ratio multiplier assembly concept disclosed herein has thus far been successfully tested in pickup trucks, it is emphasized that the principles and concepts herein are utilized also in passenger vehicles, boats such as pleasure boats, large ships, helicopters, light trucks and heavy trucks, motorcycles and construction equipment. While these are specific examples with which the present invention is used, the present invention may be also utilized in other types of engine-driven devices.

Figure 7:
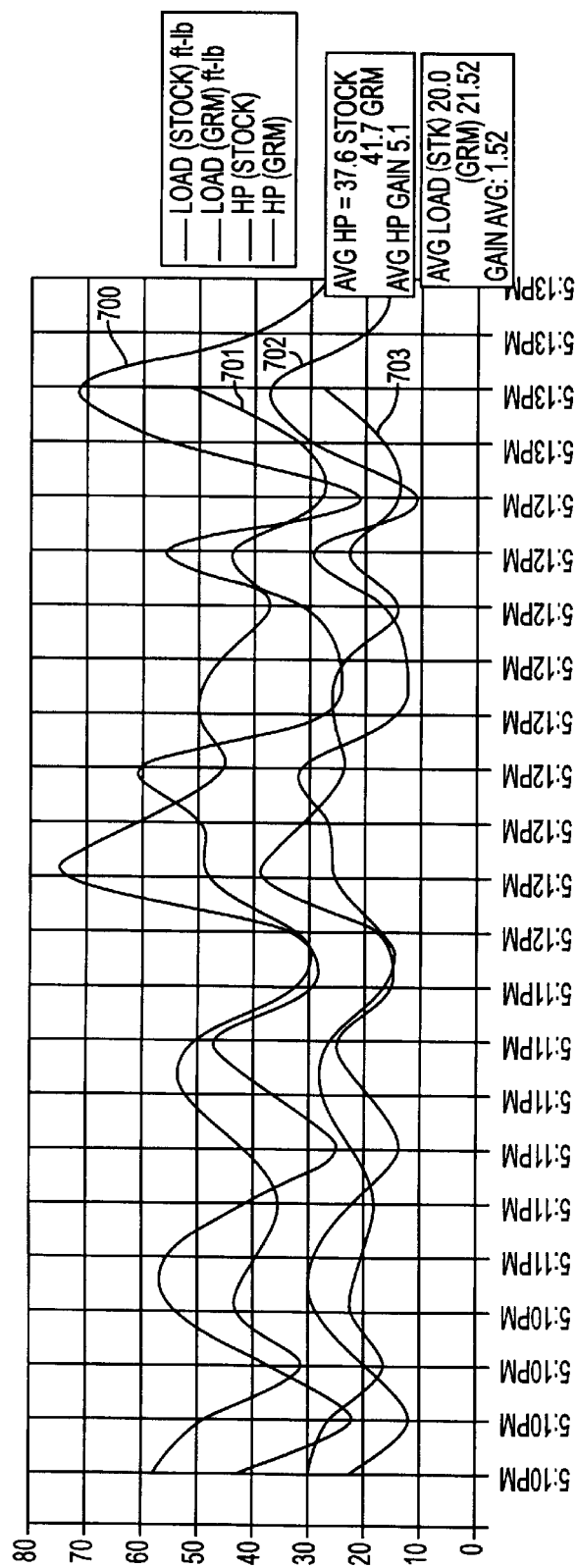
FIG. 7 is a graph plotting load (in foot-pounds) for a stock vehicle and for a vehicle equipped with gear ratio multiplier according to the present invention, as well as horse power for a stock vehicle and a vehicle equipped with the reduction gear assembly, both over a 3 minute time interval.

Referring now to FIG. 7, there are shown the results of a 3 minute dynometer test at 71 MPH comparing torque and horsepower for a vehicle using the gear ratio multiplier 10 of FIGS. 1 and 2 and for the same vehicle not using the gear ratio multiplier. The horsepower not using the gear ratio multiplier 10 is represented by curve 700 and has and has an average value of 37.6 hp, while the horsepower using the gear ratio multiplier 10 is represented by the curve 701 and has an average value of 41.7 hp. Use of the gear ratio multiplier 10 results in a horsepower gain of 5.1 hp. The torque not using the gear ratio multiplier is represented by curve 702 and has a value of 20.0 ft-lbs, while the torque using the gear ratio multiplier 10 is represented by the curve 703 and has an average value of 21.52 ft-lbs, resulting in an average torque gain for 1.52 ft-lbs.

Figure 8:
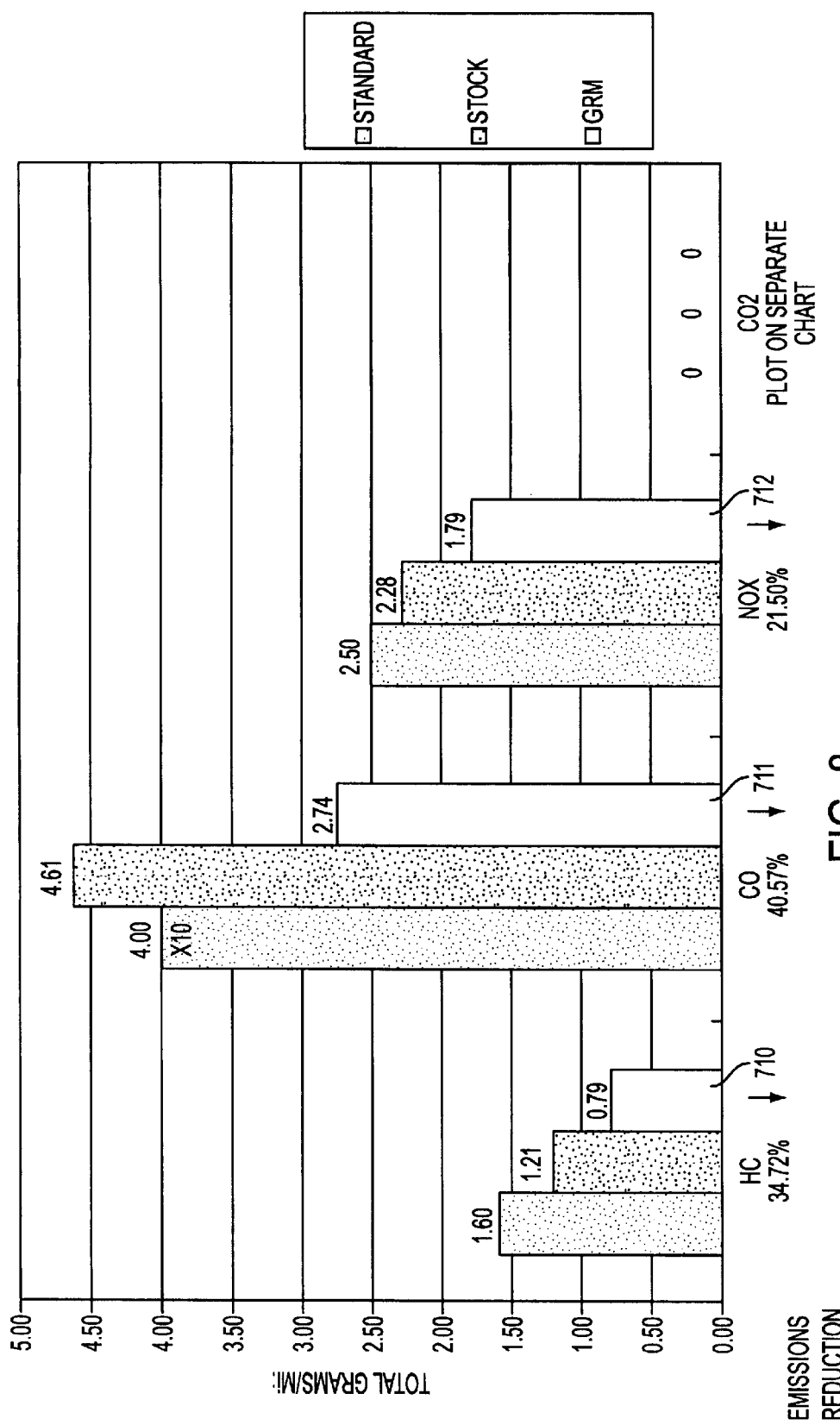
FIG. 8 is a bar graph showing comparisons of hydrocarbon, carbon monoxide and nitrous oxide emissions for a stock vehicle, the government standard and applicant's invention.

Referring now to FIG. 8, the bar graph shows emission reductions of 34.72% in hydrocarbons, 40.57% in carbon monoxide and 21.50% in nitrous oxide using the gear ratio multiplier 10 represented by bars 710, 711 and 712, respectively, as compared to bars 713, 714 and 715 for the same vehicle not using the gear ratio multiplier.

Referring now to FIGS. 9 and 10, for the same vehicle, it is seen that the hydrocarbon, carbon monoxide and nitrous oxide emissions are substantially reduced, while miles-per-gallon (fuel economy) is substantially increased.

It is to be understood that the present invention is not limited to the sole embodiments described above, but encompasses any and all embodiments within the scope of the following claims.

What is claimed is:

1. An overdrive comprising:

a first shaft adapted for connection to a source or recipient of rotation and torque;

a first gear assembly connected to the first shaft, the first gear assembly being a rotational distance reducing torque increasing gear assembly comprising at least one gear having teeth disposed at an angle to the axis of that gear, the first gear assembly having an output of a lower rotational distance and higher torque than that of the input shaft and comprising gears fixed in a meshed relationship with respect to one another;

a second gear assembly connected to the output of the first gear assembly, the second gear assembly comprising gears fixed in a meshed relationship with respect to one another with the relative sizes of the gears in the second gear assembly being different from the relative size of the gears of the first gear assembly; and an output shaft driven by the second gear assembly, the output shaft being adapted for connection to a device driven by the source of rotational and torque.

2. The gear ratio multiplier of claim 1, wherein the gear assemblies comprise first and second bevel gear assemblies.

3. The gear ratio multiplier of claim 1, wherein the gear assemblies comprise spiral bevel gear or hypoid gear assemblies.

4. The gear ratio multiplier of claim 1, wherein the gear assemblies comprise ring gears driving and being driven by pinions, which pinions have teeth disposed at an angle to the axes of the pinions.

* * * * *